3,423,333
ISONITRILE POLYMERS
Robert W. Stackman, Madison, and William L. Evers, Summit, N.J., assignors to Celanese Corporation, a corporation of Delaware
No Drawing. Filed Sept. 29, 1964, Ser. No. 400,212
U.S. Cl. 260—2     5 Claims
Int. Cl. C08g 33/00

This invention relates to novel polymers of isonitriles, also known as carbylamines or isocyanides

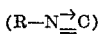

The invention is more particularly directed to normally solid addition polymers of organic isonitriles useful in a wide range of applications, including the preparation of fibers and fibrous products, shaped and molded articles, etc.

Monomeric isonitriles, and particularly the open chain aliphatic and aromatic derivatives, are well known and are reported to rapidly and spontaneously polymerize to highly colored low molecular weight residues, which appear to be dimers and trimers. For example, Hammick et al. report in J. Chem. Soc., 1876 (1930), that aromatic derivatives such as p-tolyl, p-methoxyphenol, and p-chlorophenol rapidly polymerize to unstable dark green products of low melting point. Guillemard, C.A., 1, 1697 (1907), similarly reports that ethyl isocyanide begins to polymerize at 120° C. However, despite these reported low molecular weight unstable dimers and trimers, no useful polymers have been prepared from any isonitrile derivatives.

Accordingly, it is an object of this invention to prepare stable, isontrile addition polymers of high melting point. It is a further object of this invention to prepare normally solid isonitrile polymers of relatively high molecular weight. An even further object of this invention is to provide a process for the preparation of isolable normally solid isonitrile polymers. Other objects will become apparent in the course of the following description.

It has now been found that normally solid polymers of high melting point may be prepared from organic isonitriles in the presence of cationic catalysts in fluid systems. Generally, at least one isonitrile monomer is charged to a fluid reaction zone maintained at polymerization temperature, and preferably under a closed atmosphere, as is provided, for example, by an inert gas feed. A catalytic amount of a cationic catalyst is injected and the polymerization reaction permitted to proceed to completion.

While solution systems are preferred in the practice of this invention, suspension systems are equally useful, as well as systems involving temperatures above the flow point of the resulting polymer. Atmospheric pressures are preferred for ease of operation but are not critical to effect the reaction, which may be carried out at subatmospheric or superatmospheric pressures of, e.g., 0 to 1,000 p.s.i. Suitable temperatures range from about — 100° C. up to the boiling point of the fluid environment. Preferably, temperatures between about —30 and about +30° C. are employed at atmospheric pressure. Reaction times are extremely rapid and, thus, the reaction may be substantially complete in a period of less than one minute, (e.g., a 72% yield of polymer was obtained from the polymeriaztion of a 10% solution of cyclohexyl isonitrile in diethyl ether with 2% boron fluoride diethyl etherate at —10° C. for one minute) but for optimization of yields may be continued for periods of one or several hours up to, e.g., 24 hours.

The monomer may be any organic isonitrile having the structure

wherein R is an organic moiety having up to about 20 carbon atoms, e.g. an aliphatic, aromatic or cycloaliphatic moiety. The suitable aliphatic radicals include generally the saturated and unsaturated (nonbenzenoid) hydrocarbons and their substituted derivatives, having an open chain structure, inclusive of the paraffin, olefin and acetylene hydrocarbons and further including compounds containing a minor proportion of heteroatoms, selected from the group consisting of oxygen, sulfur and nitrogen, in the open chain structure, such as, for example, ethyl, propyl, butyl, isopropyl, sec-butyl, heptyl, hexyl, pentyl, 3,3'-dimethyl butyl, 3,5-dibromopentyl, 2,4-dimethyl hexyl, 3,5-dimethyl hexyl, 2,5,5-trimethyl heptyl, 3-isopropyl-3,5-dimethyl heptyl, 4-propyl-4-isopropyl heptyl, 2 - methyl-2-chloropentyl, 2-methyl-4,4,5-tribromoheptyl, 3-bromomethyl heptyl, 2-chloro-3-methoxybutyl, 2,2-dimethyl propyl, 2,2,5,5-tetramethyl hexyl, 3-ethyl-2,3,5,5-tetramethyl heptyl, etc.

Suitable aromatic radicals include generally the hydrocarbons and their substituted derivatives having at least one ring having benzenoid unsaturation, inclusive of monocyclic, bicyclic and polycyclic hydrocarbons and those compounds having a minor proportion of heteroatoms selected from the group consisting of oxygen, sulfur and nitrogen, such as, for example, phenyl, benzyl, tolyl, xylyl, p-anisolyl, 3,5-dinitrophenyl, p-chlorophenyl, p-chloromethylphenyl, o,m,p-phenol, m-anilinyl, etc.

Preferably, R is a monovalent cycloaliphatic radical, cycloaliphatic being defined as saturated and unsaturated (nonbenzenoid) hydrocarbons and their substituted derivatives, having at least one cyclic ring structure, including the carbocyclics and the heterocyclics, wherein the heteroatoms are selected from the group consisting of oxygen, sulfur, and nitrogen, and are present in minor proportion. Preferably the cycloaliphatic radical comprises at least one carbocylic saturated ring structure, and any substituents are inert under the reaction conditions. Suitable cycloaliphatic radicals include those having up to about 20 carbon atoms, such as, for example, cyclopropyl, cyclobutyl, cyclohexyl, cycloheptyl, cyclooctyl, o-chlorocyclohexyl, 4-bromocycloheptyl, 2-nitrocyclopentyl, 3-(cyclohexyl)propyl, 2-(cycloheptyl)ethyl, 3-o-chlorocyclohexyl propyl, 5-cyano cycloheptyl, o-nitro cyclohexyl, decahydronaphthyl, bicyclo[2.2.2]octane, spirohendecane, 3,5-dimethyl cyclohexyl, m-hydroxy cyclohexyl, phenyl cyclopentyl, 3-nitrocyclopentyl, etc.

Suitable substituents on the R moiety thus include hydrogen; alkyl having up to about 5 carbon atoms, including methyl ethyl, propyl, isopropyl, butyl and pentyl; halogen, such as chlorine, bromine, iodine, and fluorine; haloalkyl, such as bromomethyl, chloroethyl, etc.; cyano; nitro; hydroxy; amino; alkoxy such as methoxy, ethoxy, etc., allyl, aryl having up to about 10 carbon atoms such as benzyl, phenyl, tolyl, xylyl, p-anisolyl, etc.; carboxyl; etc.

Polyfunctional monomers are equally applicable in the process of this invention, and may be used to particular advantage where a branched or cross-linked product is sought, e.g., to provide elastomeric properties. Particularly preferred are the bifunctional organic isonitriles such as p-diisonitrilobenzene and the diisocyanates such as 4,4'-diphenyl methane diisocyanate.

The monomer is generally dissolved in an inert solvent, which is preferably identical to that utilized for the reaction, and charged to the reaction zone as a solution in a concentration from about 1.5 weight percent up to about 80 weight percent, preferably between about 5 and 50 weight percent. Mixtures of the aforementioned monomers may also be employed to prepare homopolymer blends or copolymers. Other monomers, including aldehydes such as acetaldehyde chloral, butyraldehyde, etc.; cyclic ethers such as trioxane, dioxolane, etc., alkylene oxides such as ethylene oxide, propylene oxide, etc.; glycidyl ethers such as allyl glycidyl ether, phenyl glycidyl ether, etc., and organic isocyanates such as ethyl isocyanate, cyclohexyl isocyanate, and 4,4′-diphenyl methane diisocyanate may also be charged to the reaction zone for the preparation of copolymers of random, block or graft structure or intimate blends of homopolymers. Preferably, the charged monomers consist of one or more organic nitriles, and most preferably cycloaliphatic isonitriles, alone.

Organic isonitriles may be prepared by a Hoffmann synthesis involving the reaction of primary amines with chloroform in the presence of caustic, as reported in U.S. Patent 2,342,794 of Dreyfus; or the Gautier process, involving the reaction of an organic iodide with silver cyanide in the presence of e.g. potassium cyanide (Liebig's Ann. Chem., 146, 119 [1868]). A preferred synthetic route is the dehydration of nitrogen substituted formamides, as described by, e.g., Ugi and Meyr in German Patent 1,084,715 and Hagedorn et al., in J. Chem. Soc., 1946, p. 763.

Suitable catalysts are cationic as a class, inclusive of such compounds as boron trifluoride, antimony trifluoride, antimony fluoborate, bismuth trifluoride, bismuth oxyfluoride, nickelous fluoride, aluminum trifluoride, titanium tetrafluoride, manganous fluoride, manganic fluoride, mercuri fluoride, silver fluoride, zinc fluoride ammonium bifluoride, phosphorus pentafluoride, hydrogen fluoride, thionyl chloride, fluorosulfonic acid, phosphorus trichloride, titanium tetrachloride, ferric chloride, zirconium tetrachloride, aluminum trichloride, stannic chloride, stannous chloride, and the alkane sulfonic acids such as ethane sulfonic acid and methane sulfonic acid.

The preferred catalysts are boron fluoride-containing, such as boron fluoride itself and the boron fluoride complexes with water (such as boron fluoride monohydrate, boron-fluoride dihydrate, and boron-fluoride dihydrate, and boron fluoride trihydrate) and boron fluoride coordinate complexes with organic compounds, particularly those in which oxygen or sulfur is the donor atom. The coordinate complex of boron fluoride may, for example, be a complex with an alcohol, a phenol, an acid, an ether, an acid anhydride, an ester, a ketone, an aldehyde, a dialkyl sulfide or a mercaptan. Boron fluoride etherate, the coordinate complex of boron fluoride with diethyl ether is the preferred coordinate complex. The boron fluoride complexes with phenol and with acetic acid are also very effective. Other specific boron fluoride complexes, for example, are the complexes with ethanol, methanol, propanol, butanol, methyl acetate, ethyl acetate, phenyl acetate, benzoic acid, acetic anhydride, acetone, methyl ethyl ketone, dimethyl ether, methyl phenyl ether, acetaldehyde, chloral, dimethyl sulfide, and ethyl mercaptan.

Small amounts of catalysts ranging from a catalytic amount of, e.g., several parts per million up to 5 percent or greater based upon the isonitrile monomer are suitable, the amount employed generally being related to the concentration of monomer in the fluid medium. For example, about 0.2% may be suitably employed with a solution of 30% concentration of cyclohexyl isonitrile, while as much as 3% may be employed with a solution of 3% monomer concentration. Small amounts of from about 0.0001 percent up to about 3% are preferred.

Any inert solvent which does not participate in any undesirable side reactions under the reaction conditions is suitable for use in the practice of this invention. For ease of operation the polymer is preferably insoluble in the reaction medium. Diethyl ether, cyclohexane, toluene, xylene, benzene, heptane, pentane, m-cresol, p-chlorophenol, dimethylformamide, dimethylsulfoxide, dimethylacetamide, trichlorophenol/phenol, nitrobenzene, and acetonitrile are appropriately employed as reaction solvents.

The reaction medium is preferably substantially anhydrous, but small amounts of water or other impurities such as may be present in commercial reagents or reaction apparatus do not adversely affect the reaction.

At the completion of the reaction or at any desired intermediate time, the catalyst may be deactivated by the addition of a catalyst neutralization agent, preferably aliphatic and heterocyclic amines such as the aliphatic primary amines, e.g., n-butylamine, aliphatic secondary amines, e.g., di-n-butylamine, aliphatic tertiary amines such as tri-n-butylamine, triethylamine, etc., and heterocyclic amines such as pyridine. Preferably, the basic catalyst neutralization agent is added as a solution in an organic solvent.

The isonitrile polymers according to this invention are generally normally solid, i.e., under atmospheric pressure at room temperature, and up to above about 300° C. The softening or flow points range from between about 250° C. up to about 400° C., and the polymer melts are stable above the flow point under nitrogen, thus facilitating such operations as extrusion or melt spinning. The preferred cycloaliphatic derivatives exhibited flow points in the range of 300 to 375° C., and most preferably 330–350° C. Satisfactory colors for commercial applications were exhibited without stabilization, ranging from cream to light tan. The absence of birefringence upon examination under polarized light suggested a generally noncrystalline structure for some of the resulting polymers, although it is to be expected that optimization of catalyst variables and an appropriate selection of substituent moieties would result in at least some exhibited crystallinity. The insolubility in all common solvents, i.e., sulfuric acid, 50% sodium hydroxide, m-cresol, p-chlorophenol, dimethylformamide, dimethylsulfoxide, dimethylacetamide, trichlorophenol/phenol (7/10), nitrobenzene, formic acid and acetonitrile, displayed by certain of the products suggested at least a partially cross-linked structure. Of course, the use of diisonitriles, and the presence of certain cross-linking monomers such as the diisocyanates would be expected to result in at least a partially branched structure.

Carbon, hydrogen and nitrogen analyses as well as infrared spectrographic analyses, suggested a recurring

structure.

It is to be understood that any suitable chemical stabilizer, as well as appropriate fillers, additives, lubricants or dyes such as titanium dioxide, glass fibers, carbon black, zinc-stearate, aluminum palmitate, molybdenum sulfide, finely divided copper, magnesium, or iron, etc., may be suitably incorporated into the polymer products of this invention by any conventional means.

The characteristics of the polymer products set forth above suggest a wide variety of applications, ranging from shaped and molded articles, e.g., automobile dashboards, plumbing fixtures, gears, etc. to fibers and fibrous products such as textiles, nonwovens, etc. and including applications involving high temperature environments where the high melting points will serve to particular advantage.

The following examples serve to further illustrate without limitation the various aspects of the invention set forth hereinabove.

EXAMPLE I

The method of Ugi and Mehr, as reported, for example, in German Patent No. 1,084,715, involving the dehydration of nitrogen substituted formamides, was employed for the preparation of cyclohexyl isonitrile, except that a slightly lower boiling petroleum ether was used as a solvent in the reaction. A 71% yield of cyclohexyl isonitrile was recovered. The monomer was of exceptional purity after distillation through an eight inch bubble column exhibiting only one peak in a gas-liquid chromatographic analysis.

Fifty parts of anhydrous diethyl ether and 4.6 parts of the cyclohexyl isonitrile (prepared as reported above) were charged to a dry, nitrogen swept 100 ml. flask equipped with a mechanical stirrer. The solution was cooled to −10° C. with an ice-salt bath and 1.5 parts of a 10% solution of $BF_3$ diethyl etherate in diethyl ether (0.0012 mole, or 4.7%, calculated as $BF_3$) were added. A large amount of a cream-colored solid formed immediately and precipitated out of solution. The mixture was stirred for three hours at −10° C., whereupon the catalyst was neutralized with the addition of 2 parts of triethyl amine. The mixture was stirred for an additional 30 minutes, filtered, the solid precipitate washed thoroughly with methanol and with methylene chloride, and dried overnight in a vacuum desiccator. The yield was 4.5 parts of a cream-colored solid which softened and flowed at 329-345° C., showed no birefringence under polarized light, and was insoluble in the following solvents: sulfuric acid, 50% sodium hydroxide, m-cresol, p-chlorophenol, dimethylformamide, dimethylsulfoxide, dimethylacetamide, trichlorophenol/phenol (7/10), nitrobenzene, formic acid and acetonitrile.

*Analyses.*—Calculated for $(C_7H_{11}N)_x$ (polycyclohexyl isonitrile): C, 77; H, 10; N, 12.8 checked with those values found: C, 76.7; H, 10.2; N, 12.9.

Compression molded discs were prepared from the polymer with a Carver press at temperatures up to 225° C. The polymer melt was stable above its flow point under nitrogen.

EXAMPLE II

Example I was repeated, except that a 250 ml. flask was employed and 2.0 parts of the catalyst solution (containing 1.5 mm. of $BF_3$) were added to a mixture of 4.6 parts of cyclohexyl isonitrile in 100 parts of anhydrous diethyl ether. 2.1 parts (dry) of a tan solid which did not melt below 300° C. and was insoluble in the solvents set forth above were recovered.

EXAMPLE III

Example I was repeated, except that immediately upon the precipitation of the initial polymer formed (one minute after catalyst injection) the catalyst was neutralized by the addition of 2 parts of triethylamine, the mixture stirred for 15 minutes and the solid precipitate filtered, washed and dried. The yield was 3.3 parts of a cream-colored solid of identical properties to that prepared in Example I. An infrared spectrographic analysis indicated the presence of recurring units having the structure:

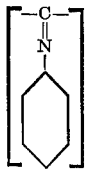

EXAMPLE IV

Example I was repeated, except that the initial charge to the 100 ml. flask reaction zone was 3.7 parts of cyclohexyl isonitrile in 50 parts of cyclohexane. After 90 minutes, 3.0 parts (dry) of a tan polymer having identical properties to that prepared in Example I were recovered.

EXAMPLE V 50 parts of absolute diethyl ether and 10.9 parts of cyclohexyl isonitrile were charged to a dry, nitrogen swept 100 ml. reaction flask equipped with a mechanical stirrer. The mixture was cooled to −70° C. and 0.24 part of $BF_3$ diethyl etherate was added. The mixture was stirred for 1.5 hours and then allowed to warm to room temperature. As the solution warmed, a tan material solidified. After 3 hours, the solid was filtered and washed thoroughly with ethanol. The yield was 2.0 parts of a hard, tan solid which did not melt or discolor at 305° C. in a capillary tube.

EXAMPLE VI 300 parts of anhydrous diethyl ether and 4.6 parts of cyclohexyl isonitrile were charged to a reaction flask equipped with a mechanical stirrer and maintained at 25-30° C. 0.6 millimol of $BF_3$ as a 10% solution of $BF_3$ diethyl etherate in diethyl ether was injected and the mixture was stirred for 5 hours, whereupon a solid precipitate was recovered of identical properties to that prepared in Example I.

EXAMPLE VII 50 parts of anhydrous diethyl ether and 4.6 parts of cyclohexyl isonitrile were charged to a dry, nitrogen swept reaction flask equipped with a mechanical stirrer. The mixture was cooled to −10° C. and 1.0 millimol of aluminum chloride injected. After 2 hours, a tan solid of identical properties to that prepared in Example I was recovered.

It is to be understood that the foregoing detailed description is given merely by way of illustration and that many variations may be made therein without departing from the spirit of this invention.

The embodiments of the invention in which an exclusive property or privilege is claimed are defined as follows.

We claim:

1. A normally solid polymer of cyclohexyl isonitrile, consisting essentially of recurring units having the structure

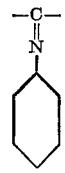

2. The polymer of claim 1, said polymer having a softening point between about 330° C. and 345° C., said polymer being insoluble in sulfuric acid, 50% sodium hydroxide, m-cresol, p-chlorophenol, dimethylformamide, dimethylsulfoxide, dimethylacetamide, 7-trichlorophenol-10-phenol, nitrobenzene, formic acid and acetonitrile.

3. The polymer of claim 2, wherein said polymer exhibits no birefringence under polarized light.

4. Process for the production of polymers of cyclohexyl isonitrile, comprising reacting cyclohexyl isonitrile in a liquid medium comprising an inert organic solvent in the presence of from about 0.0001 to about 3% of a cationic catalyst, at a temperature from about −70° C. to about +30° C. for a period between about 1 minute and 24 hours.

5. The process of claim 4 wherein said catalyst is a boron fluoride containing catalyst.

References Cited

Guillemard: Chem. Abstracts, vol. 1, pp. 1697–8 (1907).

Hammick et al.: "Journ. Chem. Soc.," London, 1930, pp. 1876–1887.

SAMUEL H. BLECH, *Primary Examiner.*

U.S. Cl. X.R.

260—67, 47, 77.5, 37, 18, 465.1